US005389434A

United States Patent [19]

Chamberlain et al.

[11] Patent Number: 5,389,434

[45] Date of Patent: Feb. 14, 1995

[54] ELECTROMAGNETIC RADIATION ABSORBING MATERIAL EMPLOYING DOUBLY LAYERED PARTICLES

[75] Inventors: Craig S. Chamberlain; Glen Connell; William C. Tait, all of St. Paul, Minn.

[73] Assignee: Minnesota Mining and Manufacturing Company, St. Paul, Minn.

[21] Appl. No.: 941,868

[22] Filed: Sep. 8, 1992

Related U.S. Application Data

[63] Continuation of Ser. No. 691,799, Oct. 2, 1990, abandoned.

[51] Int. Cl.[6] .......... B32B 5/16

[52] U.S. Cl. .......... 428/323; 342/1; 427/203; 427/205; 427/215; 428/328; 428/329; 428/403; 428/404; 428/406; 428/407

[58] Field of Search .......... 428/403, 404, 406, 407, 428/426, 432, 693, 699, 323, 328, 329; 342/1; 427/203, 205, 215

[56] References Cited

U.S. PATENT DOCUMENTS 2,951,247 8/1960 Halpern et al. .......... 343/18
3,599,210 8/1971 Stander .......... 343/18
3,721,982 3/1973 Wesch .......... 343/18 A
3,859,128 1/1975 Burks et al. .......... 428/426 X
3,951,904 4/1976 Tomonaga .......... 260/40 R
4,012,738 3/1977 Wright .......... 343/18
4,153,661 5/1979 Ree et al. .......... 264/120
4,173,018 10/1979 Dawson et al. .......... 343/18 A
4,371,742 2/1983 Manly .......... 174/36
4,579,882 4/1986 Kanbe et al. .......... 523/137
4,618,525 10/1986 Chamberlain et al. .......... 428/209
4,624,798 11/1986 Gindrup et al. .......... 252/62.54
4,624,865 11/1986 Gindrup et al. .......... 427/126.2
4,726,991 2/1988 Hyatt et al. .......... 428/329
4,728,554 3/1988 Goldberg et al. .......... 428/113
4,800,247 1/1989 Schneider et al. .......... 219/10.55
4,814,546 3/1989 Whitney et al. .......... 174/36
4,879,065 11/1989 Sterzel .......... 252/600
4,948,922 8/1990 Varadan et al. .......... 523/137 X
4,950,423 8/1990 Sullivan .......... 252/512
5,081,455 1/1992 Inui et al. .......... 342/1

FOREIGN PATENT DOCUMENTS 0374795 6/1990 European Pat. Off. .......... H01Q 17/00
1220899 9/1989 Japan .......... H05K 9/00
1216071 9/1961 United Kingdom .......... H01Q 17/00

OTHER PUBLICATIONS

*Patent Abstracts of Japan,* vol. 1, No. 30 (E-76)[1064], 29th Mar. 1977; and JP-A-51 122 356 (Mitsubishi Denki K.K.) 26-10-76, Abstract.

Ruck et al., "Radar Cross Section Handbook," vol. 2, pp. 617-622, Section 8.3.2.1.1.3, Plenum Press 1970.

U.S. Ser. No. 07/588,591, Filed Sep. 26, 1990, "Microwave Heatable Composite", Chamberlain et al.

*Primary Examiner*—D. S. Nakarani
*Assistant Examiner*—H. Thi Lê
*Attorney, Agent, or Firm*—Gary L. Griswold; Walter N. Kirn; H. Sanders Gwin, Jr.

[57] ABSTRACT

An electromagnetic radiation absorbing material comprises doubly layered core particles dispersed in a dielectric binder material. The first layer dissipates radiation; the second layer is an insulating material which helps prevent the particles from conductively contacting each other, and prevents degradation of the first layer. The absorber may be applied to an electrically conductive material, and an impedance matching material may be used.

29 Claims, 1 Drawing Sheet

ELECTROMAGNETIC RADIATION ABSORBING MATERIAL EMPLOYING DOUBLY LAYERED PARTICLES

This is a continuation of application Ser. No. 07/691,799, filed Oct. 2, 1990, now abandoned.

TECHNICAL FIELD

This invention relates to electromagnetic radiation absorbing materials which comprise dissipative particles dispersed in dielectric binders.

BACKGROUND

Electromagnetic radiation absorbing materials typically comprise one or more kinds of dissipative particles dispersed through a dielectric binder material. For example, U.S. Pat. No. 4,173,018 (Dawson et al.) discloses a material comprising an insulating resin and solid iron spheres of 3 microns diameter, or solid glass spheres of 0.4 micron diameter having a single 1.3 micron thick iron coating, for a total diameter of 3 microns. The particles comprise up to 90% of the weight of the composite material.

Substantially spherical solid particles of such sizes are often called "microspheres." A variation on the microsphere is the "microbubble," a hollow microsphere made of a material such as glass. Single thin film layers of nonmagnetic metal may be deposited on glass microbubbles, and the product dispersed through polymeric binders, as taught in U.S. Pat. No. 4,618,525 (Chamberlain et al.)

Singly layered microbubbles dispersed through polymeric binders have been used in electromagnetic shielding applications. For example, U.S. Pat. No. 4,624,798 (Gindrup et al.) describes a composite material in which the microbubbles form a network of contacting particles, giving the bulk material sufficient electrical conductivity to act as a radiation shield, i.e., like a sheet of conductive material.

SUMMARY OF INVENTION

The invention is a non-electrically-conductive electromagnetic radiation absorbing material, comprising a plurality of dissipative particles and a dielectric binder through which the dissipative particles are dispersed. Any of the dissipative particles comprises: (a) a core particle; (b) a dissipative layer located on the surface of the core particle; and (c) an insulating layer overlaying the dissipative layer at a thickness between 0.5 and 10 nanometers.

DETAILED DESCRIPTION

Figure 1:
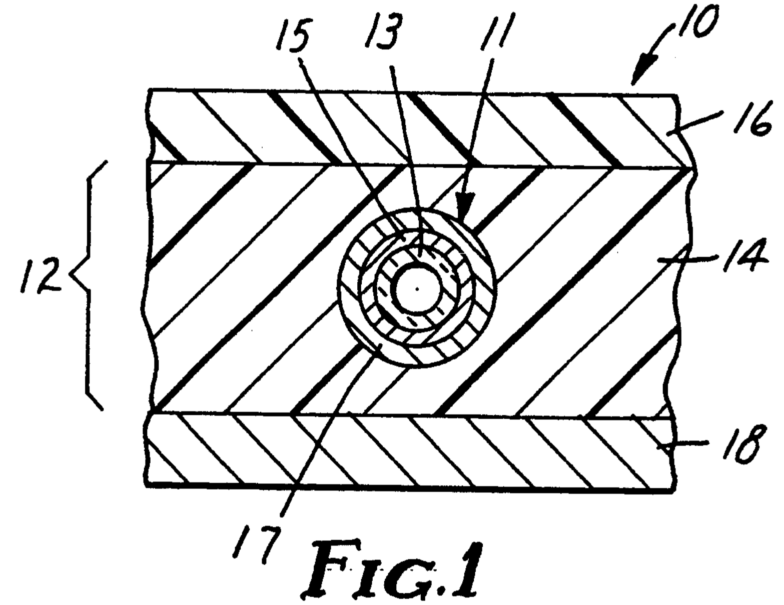
FIG. 1 is a cross sectional view of one embodiment of the invention.

One preferred embodiment of the invention is a radiation absorbing tile. FIG. 1 is a cross sectional view of this embodiment, in which such a tile 10 comprises a radiation absorbing material 12. This absorbing material 12 is applied to the radiation-incident side (in the figure, the upper side) of an optional second component, an electrically conductive material 18. The electrically conductive material 18 is preferred because it reflects radiation which is not fully absorbed back into the absorbing material 12 for further absorption. Also shown is an optional impedance matching material 16. The impedance matching material 16 is preferred because it reduces reflection of the incident radiation from the radiation-incident side of the absorbing material 12.

The absorbing material 12 comprises a plurality of doubly layered dissipative particles 11, dispersed in a dielectric binder material 14 by mixing or extrusion. Any of the doubly layered dissipative particles 11 comprises a core particle 13, a dissipative layer 15, and an insulating layer 17, the latter being the outermost layer.

The core particle material may be the same as the dielectric binder material, but, in the usual case, the two materials will not be the same, as the criteria for choosing the two materials do not exactly coincide.

The dissipative layer 15 is deposited on the core particle 13 by thin film deposition techniques. The insulating layer 17 may be deposited on the dissipative layer 15 by such deposition techniques, or it may be formed as a reaction product of the dissipative layer 15. The remainder of this discussion assumes that each member of the plurality of doubly layered particles has essentially the same thickness of dissipative layer 15, but this is not required. Generally, thicker dissipative layers absorb more radiation at higher frequencies. Thus, the need for either a broadband or narrowband absorber will suggest an appropriate distribution of dissipative layer thicknesses.

The preferred core particles 13 have as low a dielectric constant and weigh as little as possible. The core particles 13 may be essentially spherical particles, or acicular fibers, or flakes. Optimum performance is achieved if the core particle size distribution is narrow, and thus in the ideal case all the core particles 13 are the same size. The core particles 13 are formed preferably from a ceramic or polymeric material.

If essentially spherical particles are used for the core particles 13, the preferences for low dielectric constant and low weight suggest (hollow) microbubbles, not (solid) microspheres. The preferred inorganic material for the microbubbles is glass, but polymeric materials are suitable. For glass microbubbles an average outer diameter in the range of 10 to 500 microns, and a thickness (difference between inner and outer average radii) of 1–2 microns, are suitable. The preferred range of average outer diameters is 20 to 80 microns. The preferred glass microbubbles are identified by Minnesota Mining and Manufacturing Company as "SCOTCHLITE" brand glass microbubbles.

Another technique for reducing the dielectric constant of the inorganic core particles 13 is to reduce their density. One method for this is to screen them through a sieve, floating in methanol those which do not pass through, and discarding those which do not float. When S60/10000 "SCOTCHLITE" brand microbubbles having a density of 0.60 g/cc were screened through a size #325 mesh sieve (44 micron diameter opening), this process produced microbubbles having an average diameter of 70 microns, with 90% of the diameters ranging between 50 and 88 microns. (This narrow particle size distribution is preferred, but not affected by the floating in methanol.) About 23% by weight (8% by volume) of the screened microbubbles did not float.

To allow doubly layered microbubbles to remain intact through dispersion into the binder material, the unlayered microbubbles should be strong enough to remain uncrushed when subjected to pressure of preferably at least about $6.9\times10^5$ Pascal. The preferred type S60/10000 "SCOTCHLITE" brand glass microbubbles are even stronger, resisting a pressure up to about $6.9\times10^7$ Pascal. Embodiments of the invention using these stronger microbubbles in silicone rubber binders may have volume loading factors of up to 60% without significant breakage of the doubly layered microbubbles.

If acicular fibers are used, polymeric materials may be used, but the preferred material is either milled glass or the ceramic product identified by the Minnesota Mining and Manufacturing Company as "NEXTEL" 440. The lattermost fibers have an average diameter of 8 to 10 microns, and preferably have aspect ratios ranging from 1 to 40, as may be made from longer fibers by chopping with a razor blade. If inorganic flakes are used, the preferred material is mica.

The dissipative layer 15 is an inorganic material, which may be a metal or a semiconductor. Preferred materials are tungsten, chromium, aluminum, copper, titanium, titanium nitride, molybdenum disilicide, iron, iron suboxide, zirconium, and stainless steel.

The dissipative layer 15 is extremely thin relative to the core particle size. For materials having metallic conductivity, the thickness is in the range of 0.05 nanometer to 10 nanometers, and preferably about 0.4 nm to 2.0 nm, depending on the material chosen. Layers of such extreme thinness are often termed "ultrathin" layers or films. For semiconductive materials, which are less conductive than metals, the layer thickness will be proportionately larger. The thickness of the inorganic layer 15 should be uniform to within ten percent, and preferably to within five percent. In general, this is accomplished by reducing the deposition rate and increasing the deposition time.

An effective lower limit on the amount of material in the dissipative layer 15 follows from the identity of the material. Relatively small amounts of material will not form an ultrathin layer, but instead small "beads" in one or more locations on the surface of the core particle 11. This reduces the absorption performance of the invention. Thus, because materials differ in their tendencies to form beads, the identity of the material effectively sets a lower limit on the amount of material required to form an ultrathin layer at all. Therefore, for the purposes of this invention, the term "ultrathin layer" describes a layer having a sufficient amount of material to avoid forming beads on the layer substrate (which may be the core material, or another ultrathin layer).

Even if an ultrathin layer is formed, it may be a "contiguous" layer, i.e., one in which discontinuities larger than atomic size exist in the layer, but the discontinuities are not so large that beads are formed on a substantial portion of the surface of the layer substrate. However, in a preferred embodiment, the ultrathin layer is sufficiently thick to cover the entire layer substrate in a continuous shell. The term "continuous" includes ultrathin layers which have atomic-sized discontinuities, or "pinholes," which are so small that they do not eliminate electrical continuity because of electron tunneling or other phenomena.

The electromagnetic radiation absorption properties of the invention may be attributed to the polarization of the dissipative layer 15. As the electric field component of the incident radiation is oriented in one direction, the electrons in the dissipative layer 15 tend to flow in the opposite direction, producing an electric current and resistive heating. The energy required to support this heating is removed from the electric field, and therefore the incident radiation is absorbed.

However, if the amount of material in the dissipative layer 15 is too great, depolarization effects occur to reduce the effectiveness of the resistive heating process. The dipole interaction induced by the electric field polarizes the excess material in the direction opposite to the induced field (i.e., in the same direction as the incident electric field), thus reducing the amount of induced electric current.

A way to identify a suitable range of thicknesses is to consider a parameter "B." For spherically shaped dissipative particles 11, B is known as the "bubble parameter," and is the ratio of the product of the frequency of incident radiation and the core particle radius, divided by the product of the thickness of the dissipative layer and the conductivity of the dissipative layer. Generally the radiation frequency for the intended application and the core particle radius are known, and the process conditions varied to adjust the dissipative layer thickness and conductivity.

The conductivity of the ultrathin layer is not the same as the bulk conductivity of the material from which the layer is made. This is because the electronic behavior of ultrathin films is inherently different from that of bulk materials, and because impurities entrapped in the ultrathin layer have a great effect due to their proportionately greater presence in the material.

Ultrathin film conductivity can be varied by adjusting composition (e.g., for iron suboxide, the amount of oxygen introduced in the deposition chamber is controlled). For metals, the ultrathin film conductivity is held approximately constant and the thickness is controlled. Generally, thicker layers are desirable for higher incident frequencies, and vice versa. For tungsten layered microbubbles, the optimum values of B for the 1–20 GHz range follow from a 1 nm thick tungsten layer on a microbubble of about 50 micron outer diameter.

The insulating layer 17 is preferably made of aluminum oxide, silicon dioxide, zirconium oxide, or titanium dioxide. The choice of material for the dissipative layer 15 influences the choice of material for the insulating layer 17. For example, when molybdenum disilicide is used in the dissipative layer 15, silicon dioxide is the preferred material for the insulating layer 17, because it may be formed by thermal oxidation of the outer surface of the molybdenum disilicide, without direct deposition of a second layer. A similar situation applies to zirconium oxide layered on zirconium, and titanium dioxide layered on titanium or titanium nitride. Of course, in all these examples the insulating layer 17 could be separately deposited on the inorganic layer 15. Thus, in practice, the insulating layer 17 may be a reaction product of the dissipative layer 15, but it need not be.

However formed, the insulating layer 17 overlays the inorganic layer 15 at a thickness of about 1 to 10 nm, preferably about 2 nm. The insulating layer 17 allows the dissipative particles 11 to be present in the absorbing material 12 at fairly high volume loading ratios, despite possible contact between the particles. Such contact can cause the absorbing material 12 become effectively a conductive sheet which reflects, rather than absorbs, radiation. The insulating layer 17 also helps prevent degradation of the dissipative layer 15 due to oxidation or other processes. Ultrathin metal films are expected to oxidize over time, which will result in a change to the composite material permittivity. With ultrathin tungsten films, measurable changes in powder resistivity occur in a period of hours in some cases. The addition of the aluminum suboxide layer results in a material with permittivity which is constant over a period of months or more. As with the dissipative layer 15, the insulating layer 17 is an ultrathin layer which may be contiguous, but in preferred embodiments it is continuous, and uniform in thickness.

The dielectric binder 14 may be made from a ceramic, polymeric, or elastomeric material. Ceramic binders are preferred for applications requiring exposure to high temperatures, while polymeric binders are preferred for their flexibility and lightness. Many polymeric binders are suitable, including polyethylenes, polypropylenes, polymethylmethacrylates, urethanes, cellulose acetates, epoxies, and polytetrafluoroethylene (PTFE). Suitable elastomeric binders are natural rubbers and synthetic rubbers, such as the polychloroprene rubbers known by the tradename "NEOPRENE" and those based on ethylene propylene diene monomers (EPDM). Other preferred binders are silicone compounds available from General Electric Company under the designations RTV-11 and RTV-615.

The dielectric binder could be a made from thermosetting or thermoplastic material. Thermosetting materials, once heated, irreversibly cure and cannot be remelted to be reformed. Thermoplastic materials can be repeatedly heated and reformed. In either case, the materials may be heated and set into a form by one or more forces external to the binder. Typically the force is due to heat conduction, or pressure, but it may be the influence of gravity or a vacuum. In this respect the binders suitable for the present invention differ from the "conformable" materials taught in U.S. Pat. No. 4,814,546 (Whitney et al.), which require molecular forces internal to the binder (such as a mechanical stress in a stretchable material) to be responsible for the change in shape of the absorber.

Many types of adhesives have the required thermoplastic or thermosetting properties. An adhesive is a material which forms intimate contact with a surface such that mechanical force can be transferred across the contact interface. Suitable thermoplastic and thermosetting adhesives include (but are not limited to) polyamides, polyethylenes, polypropylenes, polymethylmethacrylates, urethanes, cellulose acetates, vinyl acetates, epoxies, and silicones.

Alternatively, the conformable materials mentioned above are also suitable for other embodiments of the invention. For example, a thermoplastic heat-shrinkable binder may be formed from cross-linked or oriented crystallizable materials such as polyethylene, polypropylene, and polyvinyl chloride; or from amorphous materials such as silicones, polyacrylates, and polystyrenes. Solvent-shrinkable or mechanically stretchable binders may be elastomers such as natural rubbers or synthetic rubbers such as reactive diene polymers; suitable solvents are aromatic and aliphatic hydrocarbons. Specific examples of such materials are taught in U.S. Pat. No. 4,814,546 (Whitney et al.).

The binder may be homogenous, or a matrix of interentangled fibrils, such as the PTFE matrix taught in U.S. Pat. No. 4,153,661 (Ree et al.). In general, an absorber of this embodiment is formed in a fibrillation process involving the formation of a water-logged paste of doubly layered particles and PTFE particles, intensive mixing at about 50° to about 100° C., biaxial calendering at about 50° to about 100° C., and drying at about 20° to about 100° C. The composite of PTFE fibrils and particles has the high tensile strength of the PTFE matrix.

To be effective, the absorbing material 12 should have a thickness in the direction of radiation propagation greater than about one-fourtieth (2.5 percent) of the wavelength absorbed. The invention is suitable for absorbing radiation over as broad an incident frequency range as possible in the region of approximately 2 to 40 GHz. This implies a thickness greater than the order of about 0.2 mm. Thicker layers generally provide greater absorption, but the increased weight and reduced flexibility are not desired in many applications. Thus, while layers having thicknesses up to one-fourth (25 percent) of the absorbed wavelength are possible, they are not preferred. For example, in the same frequency region this upper thickness limit is on the order of about 37.5 mm, but sufficient absorption can be obtained with layers on the order of 2.0 mm or less in thickness.

The absorbing material 12 may have a reduced specific gravity, which will produce a reduction in weight of the tile 10. Volume loading factors for composites based on carbonyl iron microspheres typically range from forty to sixty-five percent, and the specific density of iron is 7.9 grams/cm$^2$. In the present invention the volume loading factor is in the range of thirty to sixty-five percent, but the specific density of the doubly layered particles is far less, in the range of 0.10 to 0.60 g/cm$^2$. For example, consider an absorber with sixty percent volume loading of particles and a binder of specific gravity 1.0. If the absorber is constructed according to the present invention, the specific gravity of the inventive absorber will be from 0.40 to 0.46. For a similar but non-inventive absorber comprising iron spheres, the specific gravity will be 5.1, or about eleven to thirteen times as much as the inventive absorber. This shows that the metal on the particles of the present invention is used very efficiently, i.e., it is only about 0.01% (by weight) of the inventive absorber, but about 92% (by weight) of the non-inventive absorber comprising iron spheres.

The absorbing material 12 is non-electrically conductive, i.e., it has a high DC resistivity. If the resistivity is too low, the absorber 12 effectively becomes a conductive sheet, which reflects radiation instead of absorbing it. The resistivity of iron, for example, is about $10^{-5}$ ohm-cm at room temperature. Insulators typically have resistivities of $10^{12}$ ohm-cm or more. Samples of the absorbing material 12 having 60 percent volume loading of layered microbubbles had measured resistivities of greater than $2\times10^8$ ohm-cm at room temperature, indicating that they were non-conductive.

Any electrically conductive material is suitable for the optional electrically conductive material 18. The absorbing material 15 may be bound to the electrically conductive material 18 by extruding the former onto the latter and allowing the former to cure. Many thermoplastic binders are suitable for extrusion, especially polyvinylchlorides, polyamides, and polyurethanes. The electrically conductive material 18 may be a wire or cable in lieu of the flat sheet shown in FIG. 1. Alternatives to extrusion include the use of adhesives, and processes involving in-place thermal casting.

In any embodiment of the invention, impedance matching of the absorbing material to the incident medium (usually air) is preferred, but not required. Impedance matching is done by a material which maximizes transmission of incident radiation to the absorbing layer. In the embodiment of FIG. 1, an optional impedance matching material 16 is shown as a component of the tile 10. The impedance matching material 16 is bound to the radiation incident side of the absorbing material 12. Co-extrusion and the use adhesives are suitable processes for binding the materials together. The dimensions, weight, and other properties of the impedance matching material 16 are considered in the design of a complete tile 10.

A suitable impedance matching layer 16 is a layer of polymeric material having high volumes of trapped air, such as air-filled, bare, glass microbubbles embedded in the polymeric binder materials described above. For example, a suitable impedance matching material comprises 5 to 25 volume percent type S60/10000 "SCOTCHLITE" brand glass microbubbles, dispersed in a synthetic rubber such as that made from the EPDM resin identified by E. I dupont de Nemours Company as "NORDEL" brand type 1440.

Furthermore, a laminated structure, each lamina individually constructed according to the description above, is possible. For example, one lamina may be an absorber comprising doubly layered glass microbubbles, a second lamina may be an absorber comprising doubly layered ceramic fibers, and a third lamina may be an absorber comprising doubly layered inorganic flakes. Preferably two to five layers are used. The total thickness of the laminated structure may be as great as 40 centimeters, although generally each lamina will meet the thickness limitations described above. Use of a laminated structure allows the absorption profile of the composite structure to be "tuned" to a particular frequency range and bandwidth of interest.

The invention need not be in the form of a flat sheet as shown in FIG. 1. For a cylindrical conductor, for example, a pre-sized flexible cylindrical shell absorber is preferred to minimize possible stretching, cracking, or delamination of a flat laminated sheet. The pre-formed cylindrical shell could be slit along its length, wrapped around the conductor (or slid along the long axis of the conductor) with little distortion, and then adhered into place. The seam formed by the edges of the slit should be sealed.

The exact choices of materials depend on the final absorption versus frequency characteristics desired, and the physical application required. The choices of materials also dictate the procedure and equipment required to assemble the absorber, as illustrated by the following examples.

EXAMPLES 1 TO 8

Aluminum Suboxide and Tungsten Layered Glass Bubbles

In each example batch, two hundred cubic centimeters of type S60/10000 "SCOTCHLITE" brand glass microbubbles were screened through a 325 mesh (44 micron) sieve. The microbubbles which did not pass the sieve were floated in methanol, and those that did not float were discarded, the remainder then allowed to dry in air. The microbubbles retained had an average diameter of 70 microns, with 90% of the microbubbles being between 50 and 88 microns, and an average surface area (determined by the BET method) of 0.33 $m^2/g$.

The microbubbles were prepared using essentially the same method as taught in U.S. Pat. No. 4,618,525 (Chamberlain, et al.). They were tumbled in a vacuum chamber while being sputter coated with a vapor of tungsten for 120 minutes. The sputtering cathode was a water-cooled rectangular target, 12.7×20.3 cm in size. The direct current planar magnetron method was used. The argon sputtering gas pressure was 0.53 Pascal, and the background pressure was about $1.33\times10^{-3}$ Pascal. Table 1 lists various parameters and results for the example batches.

TABLE 1

| Example | Applied Power kW | Weight Percentage | Thickness nm |
|---|---|---|---|
| 1–5 | 0.19 | 0.80 | 1.3 |
| 6 | 0.16 | 0.55 | 0.9 |
| 7 | 0.26 | 0.98 | 1.6 |
| 8 | 0.18 | 0.67 | 1.1 |

The weight percentage of the dissipative tungsten layer was determined by dissolving portions of the batches in dilute hydrofloric acid in combination with nitric, hydrochloric, or sulfuric acid as appropriate. The resulting solutions were analyzed by Inductively Coupled Argon Plasma Atomic Emission Spectroscopy.

The average thickness of each tungsten layer was calculated from the weight percentage of metal and the specific surface area of the uncoated microbubbles as:

$t=(10^*W)/(D^*S)$ t=average layer thickness, nm

W=weight percentage of layer

D=density of layer material (for tungsten, 19.3 $g/cm^3$)

S=surface area of microbubbles ($m^2/g$)

Each batch was then sputtered by the same process with an aluminum target, while admitting oxygen into the chamber in the vicinity of the particles at a rate of 4.0 cc/min. This produced an insulative layer of non-stoichiometric aluminum oxide of approximately 2.0 nm thickness.

The doubly layered particles were hand mixed into an epoxy binder using a lab spatula and a 30 ml beaker. The binder material was type 5 "SCOTCHCAST" Electrical Resin supplied by the Minnesota Mining and Manufacturing Company. This product is a two-part room temperature cure epoxy consisting of two parts (by weight) of a diglycidal ether of bisphenol A to one part (by weight) of a 20 weight percent solution of diethylene triamine in an aromatic oil. The mixtures were placed under vacuum for about 10 minutes to removed air entrapped while mixing.

The volume loadings of the particles in the resin were 60% for Examples 1 and 6–8, and 50.0%, 53.5%, 57.0%, and 60.5% for Examples 2–5 respectively.

The mixtures were spread and pressed between two 75×25 mm glass microscope slides, using 1 mm spacers, and allowed to cure at room temperature for 12 hours, after which the slides were removed. This produced eight samples of hardened radiation absorbing materials.

The hardened composites were removed from the slides and machined into a flat annular rings. Each ring had an outside diameter of 7.0 mm±0.0076 mm, an inside diameter of 3.5 mm±0.0076 mm, and a known thickness of approximately 1 mm. They were placed, at a position known to ±0.1 mm, in a 6 cm long coaxial airline connected to a Hewlett-Packard Model 8510A precision microwave measurement system. The annular plastic substrates used to hold the rings in place had a relative permittivity of 2.58 and a relative permeability of 1.00.

Two hundred one step mode measurements from 0.1 to 20.1 GHz were made on each ring. Measurements of the transmission and reflection of the radiation by the sample were used to calculate the real and imaginary parts of the permittivities and permeabilities of the samples as a function of incident frequency.

Figure 2:
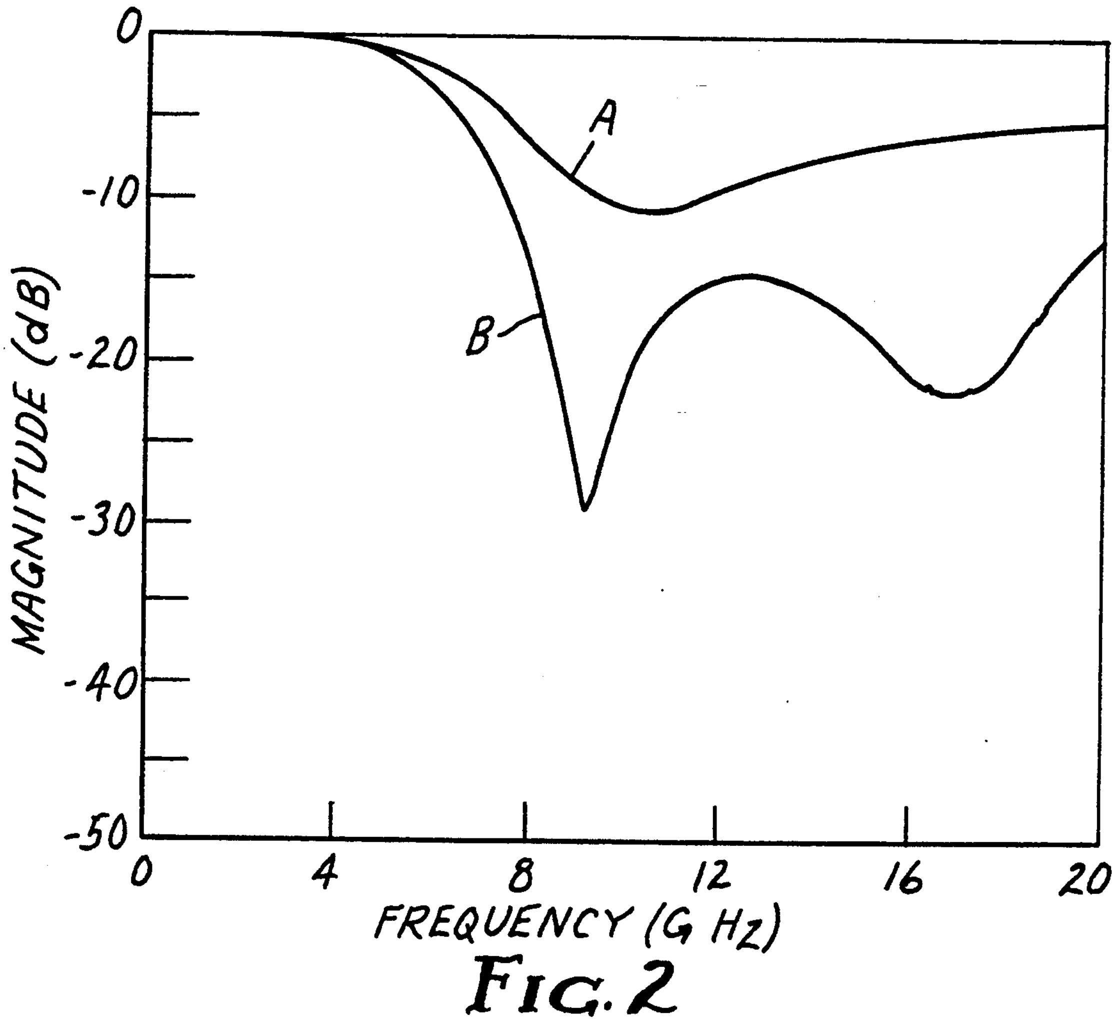
FIG. 2 is a graph of the calculated reflection magnitude of radiation normally incident upon a surface of two embodiments of the invention, as a function of incident radiation frequency.

The calculated permitivity and permeability values for Example 1 were used to generate FIG. 2, which shows (at "A") the predicted reflection magnitude of radiation incident normal to a 2.18 mm thick layer of the composite material over a conductive ground plane. The results predict the desired broad and strong absorption response, at least 5 dB over a range from about 7.5 to 20 Ghz, and at least 10 dB over a range from about 9.5 to about 11.5 GHz.

Also shown (at "B") is the beneficial effect of adding an impedance matching layer to the composite material, specifically a 2.66 mm thick layer of homogeneous material having a dielectric constant of 2.6. Absorption response is both broadened and deepened, to least 5 dB over a range from about 6.5 to over 20 Ghz, and at least 10 dB over a range from about 7.5 to over 20 GHz. Two ranges of at least 15 dB absorption are predicted: the first from 8 to 12 Ghz, with a maximum of nearly 30 dB at about 9 Ghz, and the second from 13 to 19 GHz, with a local maximum of over 20 dB at about 17 GHz.

EXAMPLES 9 TO 11

Silicon Dioxide and Molybdenum Disilicide Layered Glass Bubbles

The procedures of Examples 1 to 8 were followed, except as noted below, with the following results:

(1). The glass microbubbles were screened through a 400 mesh (38 micron) sieve; those retained had an average diameter of 45 microns, with 90% of the microbubbles being between 33 and 64 microns, and an average surface area of 0.46 $m^2/g$.

(2) The microbubbles were sputter coated with a vapor of molybdenum disilicide (density 6.31 $g/cm^3$), at a rate of 110 nm/min, at an applied power of 0.8 kW.

(3) The weight percentage of the dissipative $MoSi_2$ layer was 0.49%.

(4) The average thickness of each $MoSi_2$ layer was calculated to be 1.7 nm.

(5) Each batch was then heated in air for two hours for 200, 300, and 400 degrees Celsius for Examples 9 to 11, respectively. This forms a electrically insulating layer of silicon dioxide.

(6) The volume loadings of the particles in the resin were 60% for each of Examples 9–11.

Qualitative inspection of the calculated permittivity vs. frequency curves indicated little or no performance difference between the curves of Examples 9 and 10. However, a significant decrease in permittivity (both real and imaginary parts), by approximately a factor of two for each part, evenly across the radiation range, was shown by the curve of Example 11. We believe that this decreased performance is due to excessive oxidation of the molybdenum disilicide into silicon dioxide, effectively reducing the amount of molybdenum disilicide available for radiation absorption.

But, a material having an excessively large real part of the permittivity can exhibit undue reflection of the incident radiation at the material surface. In all three cases the magnitude of the imaginary part of the permittivity was at least one-tenth that of the real part, over much if not all of the 2–20 GHz range, indicating acceptable absorption performance. Therefore, on balance, we believe that each of Examples 9–11 would be a suitable absorber.

EXAMPLE 12

Aluminum Suboxide and Tungsten Layered Mica Flakes

The procedures of Examples 1 to 8 were followed, except as noted below, with the following results:

(1) Mica flakes obtained from Suzorite Mica Products, Inc., and designated 200 HK, were used. This product contains particles which are no larger than 75 microns, have a density of 2.9 $g/cm^3$, and have an average surface area of 2.8 $m^2/g$.

(2) The mica flakes (460 g) were sputter coated with a vapor of tungsten for 180 minutes at an applied power of 1.1 kW.

(3) The weight percentage of the dissipative tunsten layer was 1.7%.

(4) The average thickness of each tungsten layer was calculated to be 0.3 nm.

(5) The tungsten coated mica flakes were then sputter coated with aluminum suboxide to a thickness of about 2 nm.

(6) The volume loadings of the particles in the resin was 15%.

Qualitative inspection of the calculated permitivity vs. frequency curves indicated acceptable absorption performance.

EXAMPLE 13

Aluminum Suboxide and Tungsten Layered Milled Glass Fibers

The procedures of Examples 1 to 8 were followed, except as noted below, with the following results:

(1) Milled glass fibers obtained from Owens Corning Company, and designated "FIBERGLAS," were used. This product contained glass fibers with a diameter of 16 microns, and lengths from about 1 to 300 microns. They had a density of 2.56 $g/cm^3$, and an average surface area of 0.17 $m^2/g$.

(2) The glass fibers (202 g) were sputter coated with a vapor of tungsten for 135 minutes at an applied power of 0.5 kW.

(3) The weight percentage of the dissipative tunsten layer was 0.45%.

(4) The average thickness of each tungsten layer was calculated to be 1.2 nm.

(5) The tungsten coated glass fibers were then sputter coated with aluminum suboxide to a thickness of about 2 nm.

(6) The volume loadings of the particles in the resin was 33%.

Qualitative inspection of the calculated permeability vs. frequency curves indicated acceptable absorption performance.

We claim:

1. A non-electrically-conductive electromagnetic radiation absorbing material having a resistivity of greater than $2\times10^8$ ohm-cm at room temperature, comprising a plurality of electromagnetic radiation dissipative particles and a dielectric binder through which the dissipative particles are dispersed, in which the dissipative particles comprise:

(a) a core particle;

(b) an ultrathin, electromagnetic radiation dissipative layer made of an inorganic material, of thickness within the range of 0.05 to 10 nm, located on the surface of the core particle; and (c) an ultrathin electrically insulating layer having a thickness of at least 0.5 nm overlaying the dissipative layer.

2. The absorbing material of claim 1 in which the core particle is chosen from the group consisting of solid microsphere, hollow microbubble, fiber, and flake.

3. The absorbing material of claim 2 in which the core particle is a glass microbubble having an average outer diameter between 10 and 500 microns.

4. The absorbing material of claim 3 in which the core particle is a glass microbubble having an average outer diameter between 20 and 80 microns.

5. The absorbing material of claim 1 in which the inorganic material of the dissipative layer is chosen from the group consisting of metals and semiconductors.

6. The absorbing material of claim 5 in which the inorganic material of the dissipative layer is chosen from the group consisting of tungsten, chromium, aluminum, copper, titanium, titanium nitride, molybdenum disilicide, iron, iron suboxide, zirconium, and stainless steel.

7. The absorbing material of claim 1 in which the dissipative layer averages approximately 0.4 to 2 nanometers in thickness.

8. The absorbing material of claim 1 in which the dissipative layer contiguously overlays the core particle.

9. The absorbing material of claim 1 in which the dissipative layer continuously overlays the core particle.

10. The absorbing material of claim 1 in which the thickness of the dissipative layer is uniform to within ten percent.

11. The absorbing material of claim 1 in which the insulating layer comprises a material chosen from the group consisting of aluminum suboxide, silicon dioxide, zirconium oxide, and titanium dioxide.

12. The absorbing material of claim 1 in which the insulating layer is approximately about 2 nanometers thick.

13. The absorbing material of claim 1 in which the insulating layer contiguously overlays the dissipative layer.

14. The absorbing material of claim 1 in which the insulating layer continuously overlays the dissipative layer.

15. The absorbing material of claim 1 in which the insulating layer comprises a material which is a reaction product of the inorganic material of the dissipative layer.

16. The absorbing material of claim 1 in which the dielectric binder is ceramic.

17. The absorbing material of claim 1 in which the dielectric binder is polymeric.

18. The absorbing material of claim 17 in which the polymeric binder comprises a polymer chosen from the group consisting of polyethylenes, polypropylenes, polymethylmethacrylates, urethanes, cellulose acetates, and polytetrafluoroethylene.

19. The absorbing material of claim 17 in which the polymeric binder comprises a polymer chosen from the group consisting of thermosetting polymeric adhesives and thermoplastic polymeric adhesives.

20. The absorbing material of claim 17 in which the polymeric binder comprises a polymer chosen from the group consisting of heat-shrinkable polymers, solvent-shrinkable polymers, and mechanically-stretchable polymers.

21. The absorbing material of claim 1 in which the dielectric binder is elastomeric.

22. The absorbing material of claim 1 in which the plurality of dissipative particles are dispersed in the dielectric binder at a volume loading between 65 and 15 percent.

23. The absorbing material of claim 1 in which the core particles are glass microbubbles and the plurality of dissipative particles are dispersed in the dielectric binder at a volume loading between 60 and 30 percent.

24. The combination of the absorbing material of claim 1 and an electrically conductive material bound directly adjacent to the absorbing material.

25. The combination of the absorbing material of claim 1 and an impedance matching material bound to a radiation incident side of the absorbing material.

26. A laminated construction comprising two or more laminae of an electromagnetic radiation absorbing material, each lamina independently meeting the limitations of claim 1.

27. A method of making an electromagnetic radiation absorbing material, comprising the steps of:

(a) providing an electrically conductive particle comprising a core particle which has a contiguous, ultrathin, electromagnetic radiation dissipative layer from 0.05 to 10 nm in thickness and having a sufficient amount of a dissipative material to avoid forming beads on the core particle;

(b) producing a stable, contiguous, ultrathin electrically insulating layer at least 0.5 nm thick and having a sufficient amount of insulating material overlaying the dissipative material to avoid forming beads on the dissipative material; and (c) embedding the particle formed in step (b) into a dielectric binder material to form a non-electrically-conductive absorbing material having a resistivity of greater than $2 \times 10^8$ ohm-cm at room temperature.

28. The method of claim 27, in which the insulating material of step (b) comprises a reaction product of the dissipative material of step (a).

29. The method of claim 28, in which step (b) comprises 9 introducing oxygen to the dissipative material.

* * * * *

UNITED STATES PATENT AND TRADEMARK OFFICE
CERTIFICATE OF CORRECTION

PATENT NO.: 5,389,434

DATED: February 14, 1995

INVENTOR(S): Craig S. Chamberlain, Glen Connell and William C. Tait

It is certified that error appears in the above-identified patent and that said Letters Patent is hereby corrected as shown below:

Title page, item "[75]", delete "all of St. Paul, Minn." and, after "Craig S. Chamberlain" insert --Woodbury, Minn.--; after Glen Connell, insert --White Bear Lake, Minn.--; and after William C. Tait, insert --Oak Park Heights, Minn.--.

Title page, item [63], "691,799" should be --591,799--.

Title page under "Foreign Patent Documents," insert --893007, 04/1962, United Kingdom, H01Q 17/00--.

Column 1, line 7, "691,799" should be --591,799--.

Column 5, line 26, after "could be," delete "a."

Column 8, line 61, after "into," delete "a."

Column 9, line 22, before "least" insert --at--.

Column 12, line 59, delete "9."

Signed and Sealed this

Tenth Day of February, 1998

Attest:

BRUCE LEHMAN

*Attesting Officer* *Commissioner of Patents and Trademarks*